H. FULTON.
INTERNAL THREADING MACHINE.
APPLICATION FILED MAR. 21, 1921.
1,435,959.
Patented Nov. 21, 1922.
4 SHEETS—SHEET 1.
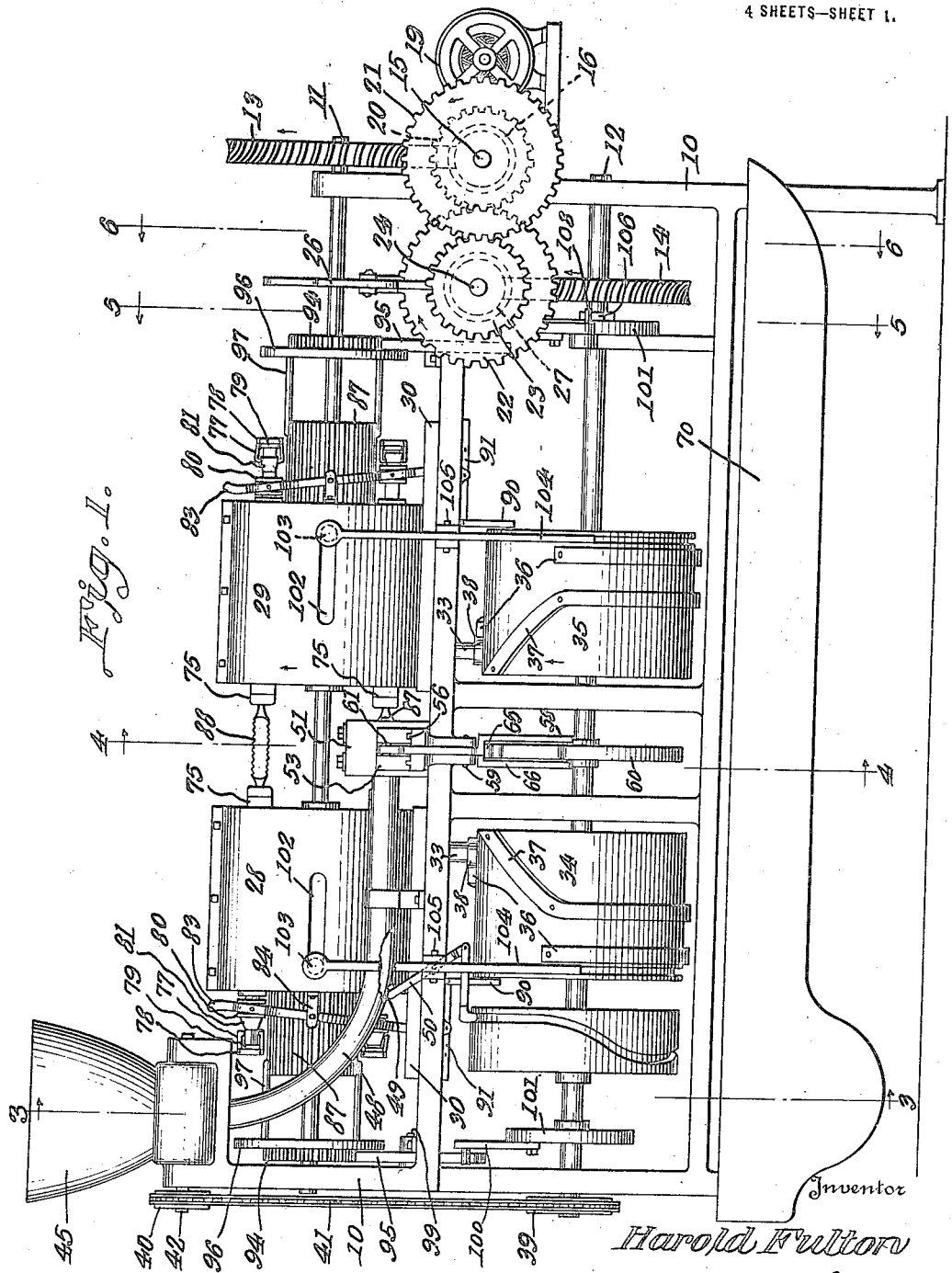
Inventor
Harold Fulton
By
Attorney

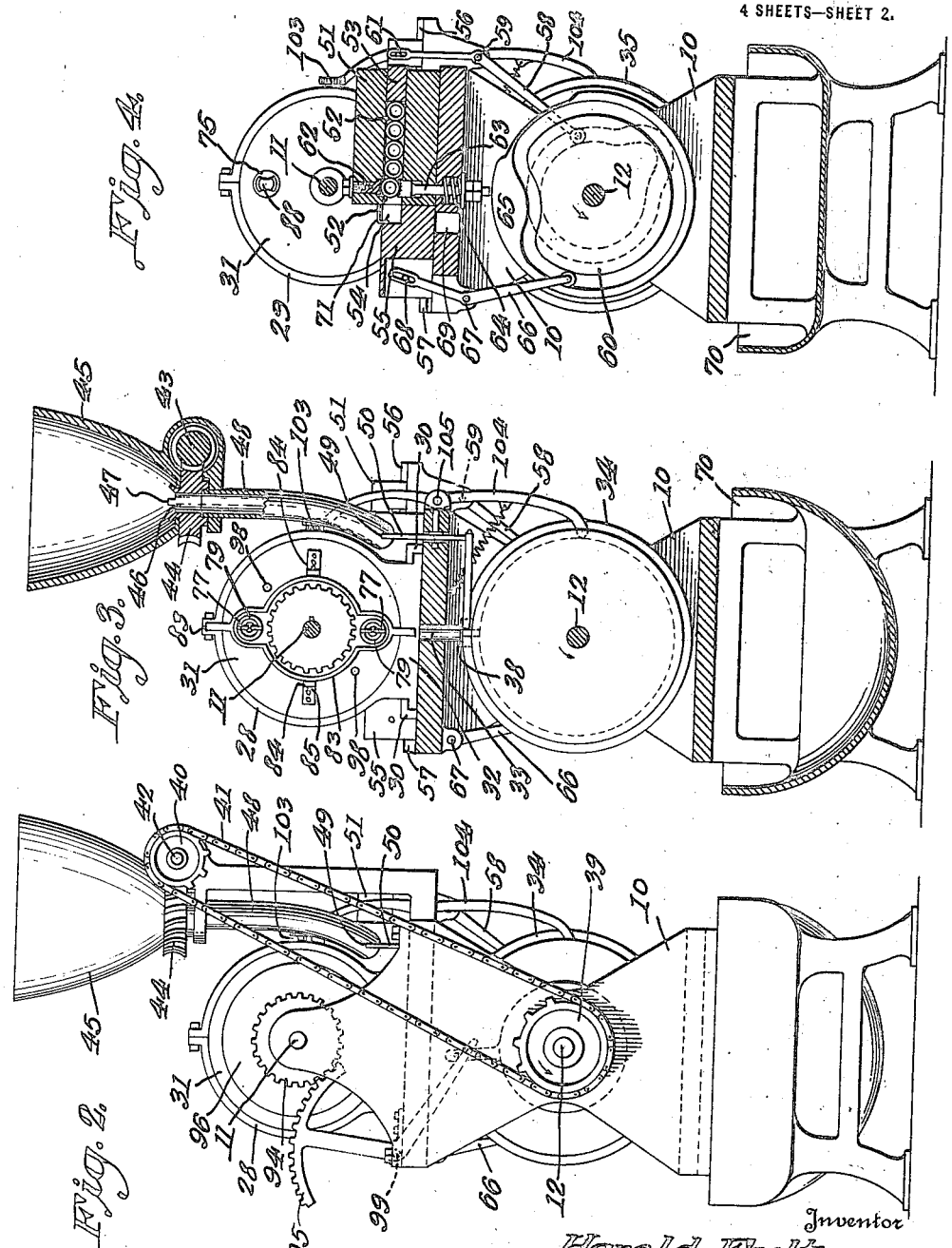

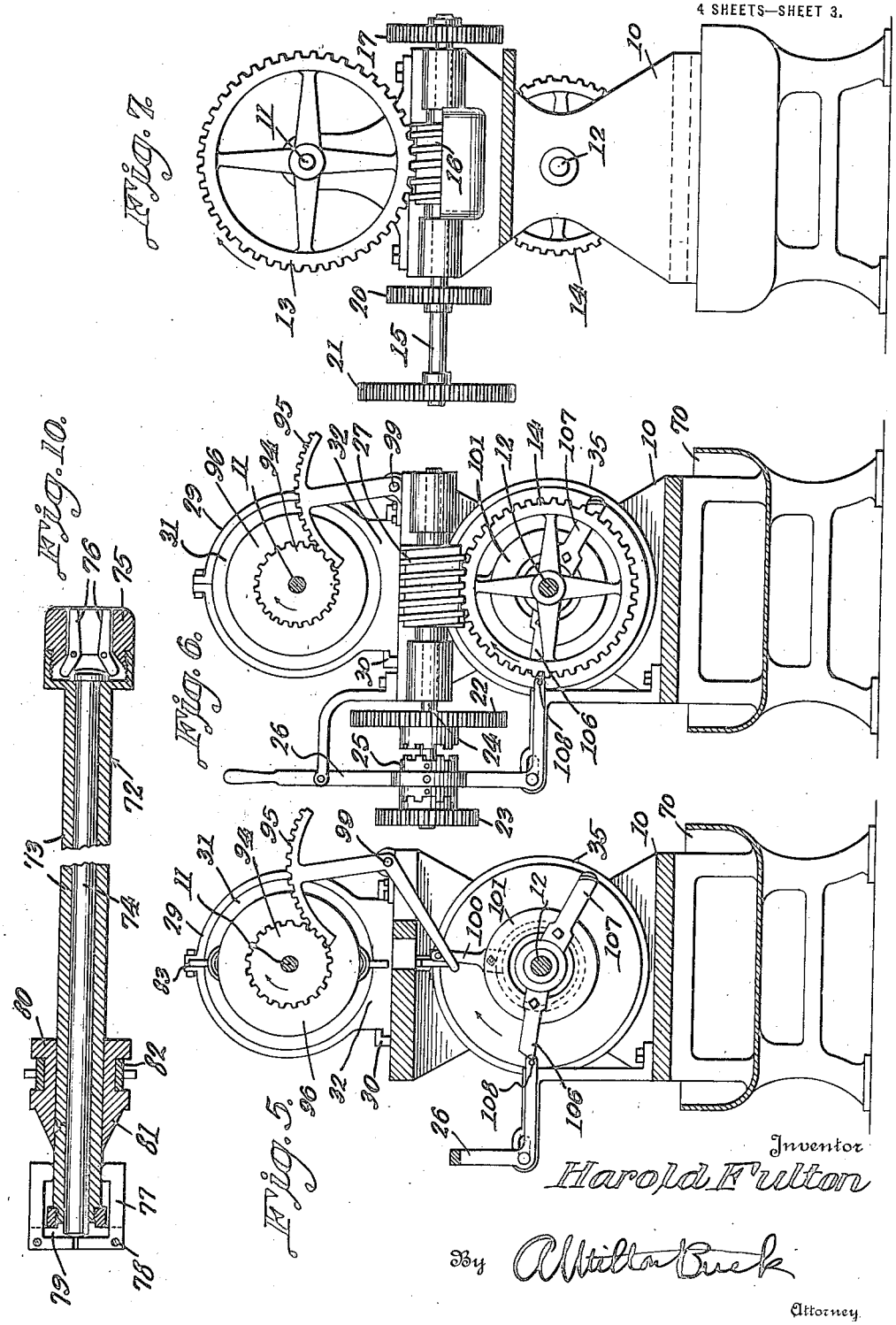
H. FULTON.
INTERNAL THREADING MACHINE.
APPLICATION FILED MAR. 21, 1921.
1,435,959.
Patented Nov. 21, 1922.
4 SHEETS—SHEET 3.
Inventor
Harold Fulton
By [signature]
Attorney

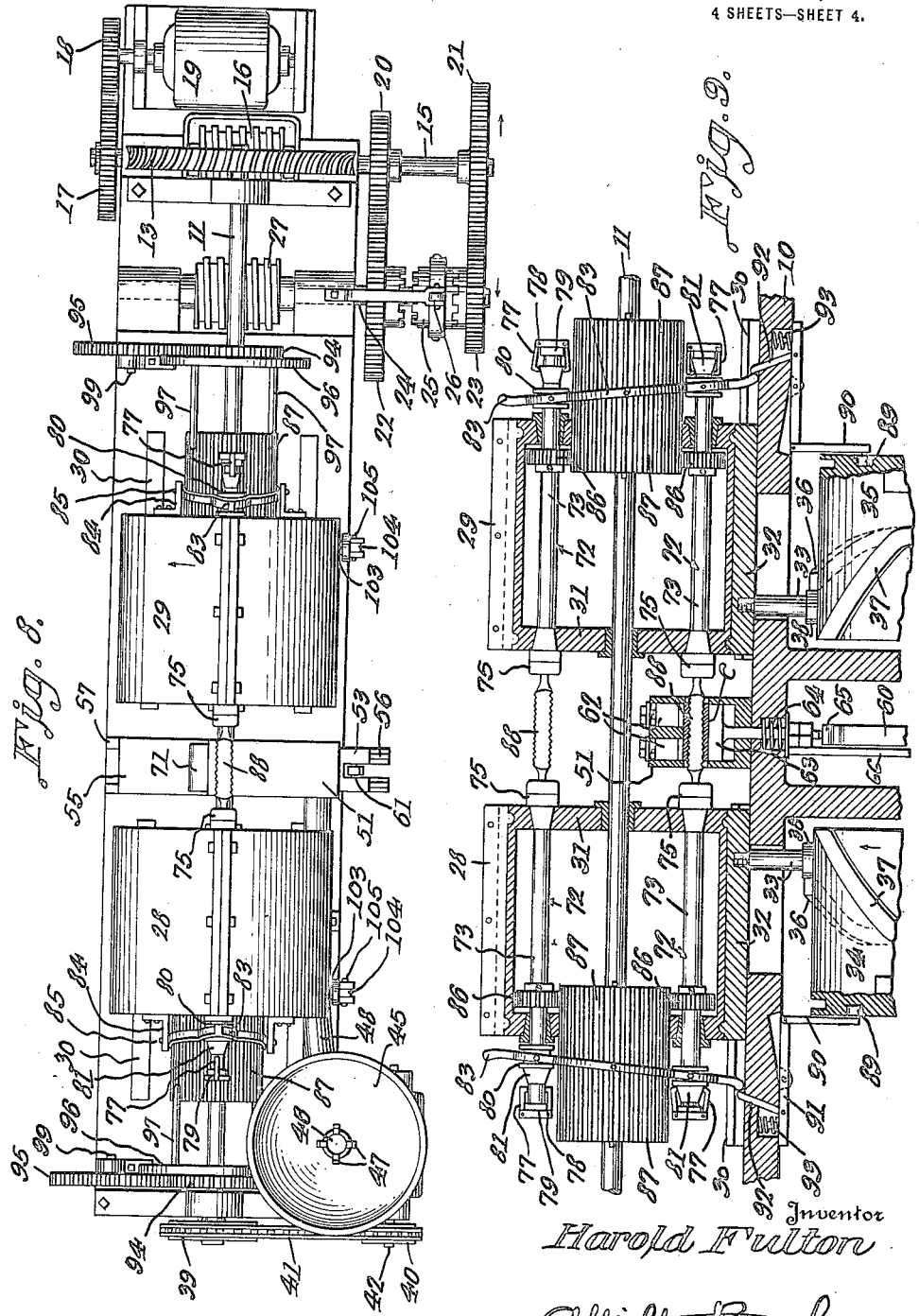

Patented Nov. 21, 1922.

1,435,959

UNITED STATES PATENT OFFICE.

HAROLD FULTON, OF ELYRIA, OHIO.

INTERNAL THREADING MACHINE.

Application filed March 21, 1921. Serial No. 454,022.

*To all whom it may concern:*

Be it known that I, HAROLD FULTON, a citizen of the United States, residing at Elyria, in the county of Lorain and State of Ohio, have invented certain new and useful Improvements in an Internal Threading Machine, of which the following is a specification.

This invention relates to screw threading machines, and more specifically to an improved internal threading machine especially designed for threading pipe-couplings.

The main object of this invention is to provide a machine which automatically takes the pipe-couplings from a hopper or disarranged mass of couplings, arranging them in a predetermined series, taking them one by one from the series and placing them in a work holder or vise. Automatically closing and opening device, automatically passing a threading tool or tap into one side of the coupling or work and withdrawing it from the opposite side, and passing the tap back to the initial position for starting it into another coupling or piece of work to be internally threaded.

Another object of the invention is to provide a machine of this character which is of comparatively simple construction, strong, rigid, durable and very efficient.

Other objects and advantages will be pointed out or implied in the following details of description in connection with the accompanying drawings in which:—

Figure 1 is a side elevation of my improved internal threading machine.

Figure 2 is a left end view thereof.

Figures 3, 4, 5 and 6 are sectional views along the lines 3—3, 4—4, 5—5 and 6—6, respectively.

Figure 7 is a right end view, motor being removed, and its supporting platform indicated in section.

Figure 8 is a top plan view.

Figure 9 is a fragmental longitudinal vertical sectional detail the section being taken in the longitudinal center of the machine.

Figure 10 is an enlarged detail sectional view through one of the shafts which includes the chuck or gripping device for holding the threading tools or taps.

Referring to these drawings in detail, in which similar reference characters correspond with similar parts throughout the several views, the main frame of the machine is generally indicated by the numeral 10. In this frame is journaled an upper rotary shaft 11 and a lower rotary shaft 12, and each of these shafts carries a worm gear wheel 13 and 14, respectively. A main driving shaft 15 is journaled in the frame 10 and carries a worm 16 which meshes with the wheel 13 for rotating the shaft 11. A gear wheel 17 is secured on the shaft 15 and meshes with a gear wheel 18 which is driven by a motor 19, the latter being shown in Figures 1 and 8.

The shaft 15 also carries gear wheels 20 and 21 which are of different diameters, and these gear wheels mesh, respectively, with gear wheels 22 and 23, which are loosely mounted on a shaft 24, journaled in the frame 10. A clutch 25 is mounted to slide axially on the shaft 24, but held against rotation with relation to the shaft by any appropriate means, such as a feather key, not shown. A lever 26 is engaged with the clutch 25 for shifting it, and this lever may easily be shifted by hand or by automatic means such as will hereinafter be described. The shaft 24 also carries a worm 27 which meshes with the worm wheel 14 for driving the shaft 12, and this shaft is driven at varying speeds, according to the position of the clutch 25, it being obvious that when the clutch is in the position shown in Figure 8, the shaft 24 rotates at a higher speed relative to the shaft 15 than when the clutch is engaged with the boss of the wheel 22. The purpose of changing the speed of this shaft 12 will become apparent as the description proceeds.

Upon the shaft 11 is carried a pair of carriers 28 and 29, and the general description of one will suffice for both, each being a reversal of the other. Referring to Figure 9, it will be seen that the frame 10 is provided with tracks 30 between which the carriers slide longitudinally of the machine. Each carrier includes a rotary cylindrical portion 31 and a non-rotary portion 32, the latter being provided with a stud 33 which extends through a slot in the frame 10 and engages with a cam-wheel 34 or 35, respectively, designed to move the carriers 28 and 29 along the tracks 30. In this connection, referring to Figures 1 and 9, it will be seen that each of the cam-wheels is provided with a ridge or rib 36 for moving the carriers simultaneously toward each other, ribs or ridges 37 being provided on these cam-wheels for moving the carriers away from one another. Rollers 38 may be provided on the studs 33.

A sprocket wheel 39 is secured on the shaft 12 and connects with a sprocket wheel 40 through the medium of a chain 41. The wheel 40 is mounted on a shaft 42, journaled in the frame 10 and carrying a worm 43 which meshes with a worm wheel 44. This wheel forms the bottom of the hopper 45 and has an opening 46 therethrough. Fingers or feeding elements 47 are formed about the margin of the openings 46, so that when the wheel 44 rotates, these fingers stir the couplings or work units which are placed in the hopper 45 so that the work units become aligned with the opening 46 and pass by gravity diwnward through the wheel 44 into a pipe or conduit 48. This conduit is provided with a slot 49 through which a lever 50 extends and forms a pusher for controlling movement of the work units or couplings by pushing them, one by one, through the pipe 48. The lower end of this pipe communicates with a work holder 51 which will now be described as follows:

Referring to Figure 4, it will be seen that the work holder 51 is provided with a horizontal channel 52 which has one end closed by a block or gate 53, the same being in position to close the pipe 48 at its point of communication with the work holder 51. The other end of the channel 52 communicates with a chamber 54 which is formed in a sliding block 55. The frame 10 is provided with tracks 56 and 57 on which the blocks 53 and 55 slide, respectively. The block 53 is pushed inward and pulled outward of the channel 52 by means of a lever 58, pivoted at 59 and engaging with a cam-wheel 60 (see Fig. 4), the upper end of this lever having a slot-and-pin connection 61 with the block 53. When this block is drawn outward, one of the couplings can pass into the channel 52 from the pipe 48, and when it is pushed inward, it pushes this pipe-coupling so as to cause one of the couplings (ahead of it) to pass into a space between two clamping jaws 62 and 63. The upper one of these jaws is preferably stationary, but the lower one is vertically movable in an opening through the bed of the frame 10 and the lower part of the holder 51. A spring 64 is seated in a recess of the frame 10 and constantly tends to press the jaw 63 downward, and the cam-wheel 60 intermittently pushes the jaw 63 upward at the proper time for coacting with the jaw 62 for clamping or gripping the couplings, one by one. When the jaw 63 is lowered, the coupling is released, and the next succeeding coupling pushes it into the chamber 54 and takes its place between the jaws 62 and 63.

The block 55 is pushed inward and pulled outward by means of a lever 66 which is operated by means of the cam-wheel 60 and swings on a pivot 67. This lever has a pin-and-slot connection 68 with the block 55. When the block 55 is pulled outward, it uncloses an opening 69 of the frame 10, so that the coupling in the chamber 54 can now drop therefrom through the opening 69 and pass into a receiver 70 which may be provided as part of the frame 10 as indicated. One or more fingers 71 may be provided at the chamber 54 for holding the coupling against lateral movement relative to the opening 69, so that the couplings will pass from the chamber 54 without fail and at the proper time.

Referring again to the carriers 28 and 29 and especially to Figure 9, it will be seen that each of the rotary cylinders 31 carries two tap holders or chucks 72 such as illustrated in detail in Figure 10. Each of these chucks comprises a hollow rotary shaft 73, a solid shaft or plunger 74, a socket member 75, a pair of clamping jaws 76, and a pair of bell crank levers 77, the latter being pivoted at 78 to a pair of lateral extensions 79 which may be formed on or secured to the shaft 73. A sleeve 80 mounted to slide on each of the shafts 73, each of these sleeves being provided with a cone or wedging element 81 which can be forced between the levers 77 and shaft 73 by means of a shifting device which comprises a sleeve 82 and a lever 83, the latter being pivoted to the sleeve 82. To be more specific, each lever 83 is pivoted to the sleeves 82 of two chucks 72; that is to the two chucks which are carried by one of the cylinders or rotors 31. Moreover, each lever 83 is pivoted at 84 to a pair of bearings 85 which are united with the rotary portions 31 of the carriers 28 and 29. The angular movement of these levers is comparatively slight, and sufficient clearance is provided in the connections of these levers with the sleeves 82 to permit them to swing on the pivots 84.

On each of the shafts 73 a gear wheel or pinion 86 is secured, and two of these pinions mesh with wide faced gear wheel 87. There are two of these wide faced gear wheels, one for each of the two carriers 28 and 29, and the two shafts 73 of each carrier is rotated by the corresponding one of the wheels 87. Now, considering the carrier 28, it will be seen that its wheel 87 extends through one end of the rotor 31, and this carrier moves axially with respect to the wheel 87, as previously described with relation to the stud 33 and cam wheel 34. During such movement, the pinions 86 remain in mesh with the wheel 87, so that the shafts 73 continually rotate when the shaft 11 rotates.

Two taps or screw threading tools 88 are provided, and the cam elements 36 and 37 are designed according to the pitch of these threading taps, so that the carriers are advanced at the proper speed for forcing the taps through the couplings without forcing the tap beyond the pitch limits. In this connection, it will be seen that one of the coupling illustrated at c in Figure 9, one of the taps 88 is in the position at which the cutting of the thread has just been completed, and the other of the taps being in a position to be transferred from one carrier to the other. In further considering the details shown in Figure 9, it is assumed that the carriers 28 and 29 have just moved to their extreme inward position, and it is now desired and intended that the lower or worming tap 88 be released by the chuck 72 of the carrier 28, and clamped by the lower chuck 72 of the carrier 29; and, on the other hand, that the upper chuck 72 of the carrier 29 is to release the upper tap 88, while the upper chuck of the carrier 28 is to clamp this tap; so that when the carriers start to move away from one another, the lower tap will move rightward with the carrier 29 while the upper tap moves leftward with the carrier 28. It is understood, of course, that the chucks 72 must rotate in unison, and that the lower tap 88 is withdrawn by an unscrewing movement. It should be understood that when the lower tap is fully withdrawn from the coupling c, the rotors 31 are rotated for bringing the lower tap into the upper position and bring the upper tap into lower position and into alignment with another coupling c which has been placed in the work holder by means of the mechanism previously described in connection with Figures 1 and 4. Therefore, the taps 88 are passed alternately through the work holder, each time forming a thread in a succeeding coupling.

Referring again to Figure 10, it will be seen that the levers 77 push the plunger 74 axially and cause the jaws 76 to close upon the shanks of the taps 88. In order to effect this operation of the chucks, through the medium of the levers 83, as previously described, the cam-wheels 34 and 35 are engaged with the rollers 89 carried by links 90. These links are pivotally connected to levers 91, and to each of these levers is pivotally connected a bar or stop 92 which extends upward through an opening in the frame 10. A spring 93 is provided for each lever 91 and coacts therewith for normally holding the stops 92 depressed. However, when the cam-wheels 34 and 35 reach the position shown in Figure 9, they swing the levers 91 so as to raise the stop 92 into the position shown. Therefore, when the lever 83 of the carrier 28 moves outward, the corresponding stop 30 engages this lever and moves it to a position for disengaging its lower cone 81 from its bell cranks 77, while simultaneously disengaging the upper cone 81 from the corresponding bell cranks 77, thus releasing the lower tap from the carrier 28, engaging the upper tap by the carrier 28 releasing the upper tap from the carrier 29 and engaging the lower tap by the carrier 29. In order to effect this engaging and releasing of the taps, the cones 81 of the carrier 29 are reverse with respect to the bell crank levers 77, as illustrated in Figure 9.

For the purpose of intermittently rotating the rotors 31 of the carriers 28 and 29, the shaft 11 is provided with gear wheels 94, rotatable thereon, and segmental racks 95 are journaled on the frame 10 and mesh with the gear wheels 94. Disks 96 are united with the gear wheels 94 and each of the disks 96 carries two pins 97, and these pins engage with holes 98 (Figure 3) in the rotors for stopping these rotors and holding them in the position for aligning shafts 73 axially with the coupling c which is held in the work holder 51. For the purpose of operating the rack 95 the same is formed on a lever which is pivoted on the main frame at 99, and the lower end of this lever stands in the path of an arm 100 which is adjustably mounted on a disk 101, this disk being secured on the shaft 12. After the arm 100 has revolved to a predetermined position, it becomes disengaged from the lever which carries the rack 95, and the latter may be returned to its initial position (Figure 5) by any appropriate means. Each wheel 94 may be provided with a ratchet (not shown), so that it may be returned to its initial position without returning the disk 96.

For the purpose of holding the rotors 31 in the operative position when the pins 97 are disengaged from the rotors, the non-rotary portions of the carriers are slotted at 102, and a stud or detent 103 extends into each slot, and these studs engage, respectively, with the rotors 31. The studs 103 are held by levers 104, pivoted to the frame 10 at 105 and engage with the cam-wheels 34 and 35. These cam-wheels are designed to intermittently press the lower ends of the levers 104 outward so as to cause their upper ends to move the studs 103 inward.

The disk or rotary member 101 is provided with radial extensions or arms 106 and 107 which engage with a pin 108 on the lever 26 (Figures 5 and 6). These arms 106 and 107 are designed to alternately shift the lever 26 from the position in which its clutch 25 engages with the boss of the wheel 22. By this means, the clutch 25 is automatically shifted, for varying the speed of the shaft 12.

What I claim is:

1. In a device of the class described, a work holder, carriers arranged at opposite sides of said work holder, axially aligned pairs of shafts, means for intermittently rotating the carriers so that the axially aligned shafts thereof will be brought successively into alignment with the work, means for halting the rotation of said carriers, a threading bit, means for advancing and retracting said carriers relative to said work holder, and means for causing said shafts to transfer said threading bit from a shaft of one carrier to a shaft of the other carrier.

2. In a device of the class described, a work holder having an opening therein, slides movable into and out of said holder at the opposing ends thereof, means for operating one of said slides to insert work into said opening, means for clamping the work when so positioned, and means for operating the other of said slides to remove the work from the holder.

3. In a device of the class described, a work holder, the said work holder having an opening therein, a magazine communicating with one end of the holder, a slide to force work into said opening from said magazine, a clamping jaw in the bottom of said holder, a cam for moving said jaw upwardly against the work in said opening, and means for discharging work from said holder.

4. In a device of the class described, a work holder, means for feeding work into said holder, a bed supporting said holder, the said bed having an opening therein, near the discharge end of said holder, means for forcing work from said holder, a slide normally covering said opening, a ledge on said slide to receive the work discharged from said holder, fingers overlying said ledge and the work thereon, the said fingers being disposed above said opening, and means for retracting said slide.

5. In a device of the class described, a work holder, a pair of carriers, pairs of aligned shafts on said carriers, clamp mechanism on the ends of said shafts for engaging a bit, means for positioning the aligned shafts in alignment with work in the said holder means for moving said carriers toward and away from said holder, a grip mechanism, on each of said shafts, and means governed by the movement of said carriers for opening the grip member of one of the aligned shafts and closing the grip member on the other one of the aligned shafts.

6. In a device of the class described, a work holder, a carrier, means for sliding said carrier toward and away from said work holder, shafts on said carrier, means to rotate said shafts, means for rotating said carrier to position its shafts alternately in alignment with work in said holder, clamping means on the ends of said shafts, a bit adapted to be held alternately by the said clamping means, and means governed by the movement of said carrier to free said bit from one said clamping means.

7. In a device of the class described, a work holder, a carrier movable toward and away from said work holder, tapping mechanism carried by said carrier, the said carrier being rotatable, a disk, a pin on said disk adapted to engage said carrier, means for moving said carrier toward or away from said pins, and means for intermittently rotating said disk.

8. In a threading device of the class described, a work holder; a pair of threading tools; gripping means for holding said tool; and means for causing said tools to alternately operate upon work within said holder, said means being adapted to transfer the unengaged tool from its finished to its starting position while the other of said tools is performing its cutting operation.

9. In a device of the class described, a work holder; a pair of threading tools; a pair of supporting means for said tools; a plurality of pairs of axially alined gripping means carried by said supporting means; means for causing the members of each pair of gripping means to alternately grip and release one of said threading tools, whereby the latter may be transferred from one member of a pair to the other; and means for causing said supporting means to alternately move said pairs of gripping means and said threading tools into and out of operative position relative to said work holder.

10. In a device of the class described, a work holder; a pair of threading tools; a pair of rotatable and axially movable supports for said tools; a pair of rotatable tool gripping means carried by each of said supporting means, the members of one pair being in axial alinement with the members of the other pair; means for rotating said supporting means to alternately move said tools into and out of operative position relative to said work holder; means to cause said supporting means to approach and recede from one another in an axial direction to cause said threading tools to engage the work in said holder; and means for controlling said gripping means to cause them to alternately grip and release said tools, whereby the latter may be transferred from one member of an axially alined pair to the other.

11. In a device of the class described, a work holder; a pair of threading tools; two pairs of axially alined gripping means adapted to hold said tools alternately in operative and inoperative positions relative to said work holder; and means for causing said gripping means to alternately grip and release said tools, whereby the latter may be transferred from one member of a pair to the other member thereof.

In testimony whereof, I affix my signature.

HAROLD FULTON.